US012372061B2

(12) United States Patent
Scheller et al.

(10) Patent No.: US 12,372,061 B2
(45) Date of Patent: Jul. 29, 2025

(54) WIND BLADE CLAMP

(71) Applicant: Aspen Custom Trailers Inc., Leduc (CA)

(72) Inventors: Patrick Scheller, Leduc (CA); John Zork, Leduc (CA); Benjamin Christiani, Leduc (CA)

(73) Assignee: Aspen Custom Trailers Inc., Leduc (CA)

( * ) Notice: Subject to any disclaimer, the term of this patent is extended or adjusted under 35 U.S.C. 154(b) by 294 days.

(21) Appl. No.: 18/079,804

(22) Filed: Dec. 12, 2022

(65) Prior Publication Data

US 2023/0184221 A1     Jun. 15, 2023

(30) Foreign Application Priority Data

Dec. 13, 2021   (CA) .............................. CA 3141942

(51) Int. Cl.
*F03D 13/40* (2016.01)
*B25B 5/04* (2006.01)

(52) U.S. Cl.
CPC .............. *F03D 13/40* (2016.05); *B25B 5/04* (2013.01)

(58) Field of Classification Search
CPC ............ F03D 13/40; B25B 5/04; Y02E 10/72
See application file for complete search history.

(56) References Cited

U.S. PATENT DOCUMENTS

| 9,567,969 | B2 * | 2/2017 | Sigurdsson | B60P 3/40 |
| 10,697,437 | B1 * | 6/2020 | Alvarez | A47B 81/005 |
| 11,794,790 | B2 * | 10/2023 | Ferris | F03D 13/40 |
| 2007/0189895 | A1 * | 8/2007 | Kootstra | F03D 80/00 416/9 |
| 2022/0126886 | A1 * | 4/2022 | Ferris | F03D 13/40 |
| 2022/0154698 | A1 * | 5/2022 | Mathiasen | B60P 3/40 |
| 2023/0228246 | A1 * | 7/2023 | Geene | F03D 13/25 29/889.21 |
| 2024/0011468 | A1 * | 1/2024 | Sullivan | F03D 13/401 |
| 2024/0376864 | A1 * | 11/2024 | Madsen | F03D 13/40 |

FOREIGN PATENT DOCUMENTS

EP         3722600 A1 * 10/2020  ............... B60P 3/40

OTHER PUBLICATIONS

Mathiasen et al. (Year: 2020).*

* cited by examiner

*Primary Examiner* — Aaron R Eastman
(74) *Attorney, Agent, or Firm* — Lowe Graham Jones PLLC

(57) ABSTRACT

An adaptable wind blade clamp for securely fastening and supporting a wind turbine blade during transportation. Walking beams are pivotably coupled to inner sides of the wind blade clamp jaws, and pads which contact the wind turbine are pivotably coupled to ends of the walking beams, resulting in a wind blade clamp which easily adjusts to the varying cross-sectional profiles of the wind turbine blade along its length. The wind blade clamp is optionally provided with an edge walking beam and edge pads to support and protect the leading edge of the wind turbine blade.

12 Claims, 13 Drawing Sheets

WIND BLADE CLAMP

PRIORITY CLAIM

This application claims the benefit of priority from Canada Patent Application No. 3,141,942 filed Dec. 13, 2021, the contents of which are incorporated herein by reference.

FIELD OF THE INVENTION

This invention relates to transportation. In particular, this invention relates to transportation of wind turbine components, namely wind turbine blades.

BACKGROUND OF THE INVENTION

Wind is an important renewable energy source that can be captured using wind turbines. The wind acts upon aerodynamic wind blades that form the rotor of the turbine, in turn actuating a generator to generate electric power. A wind turbine comprising longer blades will capture more of the available wind energy in a given area and will therefore result in a more efficient electrical power generation installation. As a result, increasingly long wind turbine blades are being used. Blades that are 50 meters long or longer are relatively common, and wind turbines utilizing blades over 100 meters long are entering production.

Wind turbine installations are often located in remote locations where the weather conditions are ideal for wind power generation. The components must therefore be transported, often over long distances, from the manufacturing site to the site of use. For reasons relating to strength and weight of the wind turbine blade, it is preferable to manufacture the wind turbine blade as a single piece construction. Transport by conventional tractor trailer or train deck is therefore not feasible for the increasingly longer single piece wind turbine blades that are prevalent in new wind turbine installations.

One possible solution is to secure the root of the wind blade to the tractor unit and provide a separate non-tractive trailer unit which supports the blade at a distant point along its length, often near the tip. The trailer unit must be securely fastened to the wind blade in a manner that does not damage the blade.

Owing to the aerodynamic properties of the wind blade, the cross-sectional profile of the wind blade changes constantly along the length of the wind blade. Further, the profiles of wind blades corresponding to different types of wind turbines will also differ. Accordingly, the requirements for securely fastening the wind blade support to the wind blade will differ from place to place along the length of the wind blade and between types of blades. It would be advantageous if the wind blade support could be easily adapted to various positions along the lengths of various different types of systems.

It is therefore an object of this invention to provide a universally adjustable apparatus for clamping a wind blade to a support.

It is a further object of the invention to provide an adjustable non-tractive trailer unit for supporting a wind blade during transportation.

These and other objects will be better understood by reference to this application as a whole. Not all of the objects are necessarily met by all embodiments of the invention described below or by the invention defined by each of the claims.

SUMMARY OF THE INVENTION

In one aspect, the invention comprises a wind blade clamp for securely holding and supporting a wind turbine blade. The wind blade clamp comprises a lower jaw and an upper jaw which is preferably pivotably coupled to the lower surface jaw by a clamp pivot. A first interior surface of the lower jaw is preferably lined with one or more lower pads. Each of the lower pads is preferably pivotably coupled to the first interior surface by a lower jaw pin insertable through a lower jaw hole on the first interior surface. A primary support beam is preferably coupled to a second interior surface of the upper jaw. A plurality of walking beams depend from the primary support bar. Preferably there are two walking beams, each walking beam pivotably coupled to an end of the primary support bar. An upper pad is pivotably coupled to each end of each walking beam. when a wind blade is placed on the lower pads and the upper jaw is closed over the lower jaw, the pivoting connections between the upper pads and the walking beams and between the walking beams and the primary support beam cause the upper pads to automatically re-position and adjust to the cross-sectional profile of the wind blade at the point where it is clamped, providing uniform clamping force over the full surface of each pad so as to avoid damaging the wind blade.

The lower jaw preferably further comprises a side walking beam pivotably connected to the lower jaw proximate to the clamp pivot. Edge pads are pivotably connected to opposing ends of the side walking beam, the pivotable connections between the edge pads and the side walking beam, and between the side walking beam and the lower jaw allow the edge pads to automatically re-position and adjust to securely cushion the edge of the wind blade against any potentially damaging impacts that could occur against the lower jaw.

In some embodiments the pivotable connections between the upper pads and the walking beams may be rigidly locked so as to facilitate insertion of the wind blade in to the wind blade clamp. In some embodiments, the pivotable connections between the edge pads and the edge walking beam may likewise be rigidly locked so as to facilitate insertion of the wind blade in to the wind blade clamp. Once the wind blade clamp is fully inserted and supported by the lower pads, the pivotable connections are unlocked, thereby allowing the upper pads and edge pads to freely pivot again. The upper jaw can then be lowered over the lower jaw and the upper pads and edge pads can adjust and reposition to support the wind blade as described.

The lower jaw preferably further comprises a plurality of toggle latches, and the upper jaw preferably comprises toggle latch keepers for each of the toggle latches, allowing the upper jaw to be securely fastened to the lower jaw. This prevents the wind blade from being inadvertently released from the wind blade clamp if clamping force is lost. The toggle latches may also supply or augment the clamping force.

The wind blade clamp is preferably connected to a base. In some embodiments, the base comprises a wheeled dolly. A turntable is mounted on the wheeled dolly. A first tilt table is mounted on the turntable. A second tilt table is mounted perpendicularly to the first tilt table, and the wind blade clamp is mounted to the second tilt table. This arrangement allows the wind blade and wind blade clamp to pitch, yaw, and roll relative to the wheeled dolly as required during transportation. The turntable may be coupled to a steering linkage for the wheeled dolly to enable the wheeled dolly to turn in response to the movement of the wind blade clamp so as to avoid jack-knifing. In other embodiments, the base comprises a ship deck and the wind blade clamp is rigidly connected to the ship deck. In still other embodiments, the base comprises a train car. In these embodiments some or all of the turntable and first and second tilt tables may also be included. Alternatively, for wind blades that are shorter than the train car length, the wind blade clamp may be rigidly connected to the train car.

According to another aspect of the invention, a clamping apparatus for securing a wind turbine blade comprises a lower jaw, an upper jaw, one or more lower pads connected to the lower jaw, one or more walking beam assemblies pivotably coupled to the upper jaw, each of the one or more walking beam assemblies comprising a walking beam and a plurality of upper pads pivotably coupled to the walking beam, at least two upper pads of the plurality of upper pads pivotably coupled to respective ends of the walking beam.

According to a further aspect, the upper jaw comprises a primary support beam depending from an inner surface of the upper jaw. The one or more walking beam assemblies may comprise two walking beam assemblies pivotably coupled to respective ends of the primary support beam. The primary support beam may be pivotably coupled to the inner surface of the upper jaw. the primary support beam may be repositionable along the inner surface of the upper jaw.

According to a further aspect, the upper jaw is pivotably connected to the lower jaw.

According to a further aspect, the lower jaw comprises a side pad assembly pivotably connected to the lower surface jaw. The side pad assembly may comprise a side walking beam and two edge pads, each of the edge pads pivotably connected to a respective end of the side walking beam.

According to a further aspect, the clamping apparatus comprises a base and a joint assembly connecting the lower jaw to the base. The base may comprise a plurality of wheels. The joint assembly may permit one degree of freedom of rotational movement of the lower surface jaw relative to the base. The joint assembly may permit two degrees of freedom of rotational movement of the lower surface jaw relative to the base. The joint assembly may permit three degrees of freedom of rotational movement of the lower surface jaw relative to the base.

According to a further aspect, each of the plurality of lower pads is repositionable along the lower jaw.

According to a further aspect, each of the plurality of lower pads is pivotably connected to the lower surface jaw.

According to another aspect of the invention, a transportation system for a wind turbine blade comprises a tractor unit supporting a root of the wind turbine blade, a trailer unit clamped to and supporting the wind turbine blade, the trailer unit comprising a frame supported on a plurality of wheels, a wind blade clamp connected to the frame, the wind blade clamp comprising a lower jaw, an upper jaw pivotably coupled to the lower jaw, one or more lower pads pivotably coupled to the lower jaw, a primary support beam depending from the upper jaw, a first walking beam pivotably coupled to a first end of the primary support beam, a second walking beam pivotably coupled to a second end of the primary support beam, two leading edge pads pivotably coupled to respective ends of the first walking beam, and two trailing edge pads pivotably coupled to respective ends of the second walking beam.

According to a further aspect, the wind blade clamp comprises a side walking beam assembly pivotably coupled to the lower jaw, the side walking beam assembly comprising a side walking beam and a plurality of edge pads pivotably coupled to respective ends of the edge walking beam.

According to a further aspect, the leading edge pads are contoured to substantially conform to a first cross-sectional profile of the wind turbine blade adjacent to a leading edge of the wind turbine blade.

According to a further aspect, the trailing edge pads are contoured to substantially conform to a second cross-sectional profile portion of the wind turbine blade adjacent to a trailing edge of the wind turbine blade. The edge pads may be contoured to substantially conform to a leading edge of the wind turbine blade.

According to a further aspect, the trailer unit comprises a turn table mounted to the frame, a first tilt table mounted to the turn table, a second tilt table mounted on and substantially orthogonal to the first tilt table, and wherein the wind blade clamp is mounted to the second tilt table. The turn table may be connected to at least two wheels of the plurality of wheels by a steering linkage.

The foregoing may cover only some of the aspects of the invention. Other and sometimes more particular aspects of the invention will be appreciated by reference to the following description of at least one preferred mode for carrying out the invention in terms of one or more examples. The following mode(s) for carrying out the invention are not a definition of the invention itself, but are only example(s) that embody the inventive features of the invention.

BRIEF DESCRIPTION OF THE DRAWINGS

Preferred and alternative examples of the present invention are described in detail below with reference to the following drawings.

FIGS. 1A-1C are cross sections of the representative wind blade of FIG. 1 taken at section lines A-A, B-B, C-C, respectively of FIG. 1;

DETAILED DESCRIPTION OF THE PREFERRED EMBODIMENT

Figure 1:
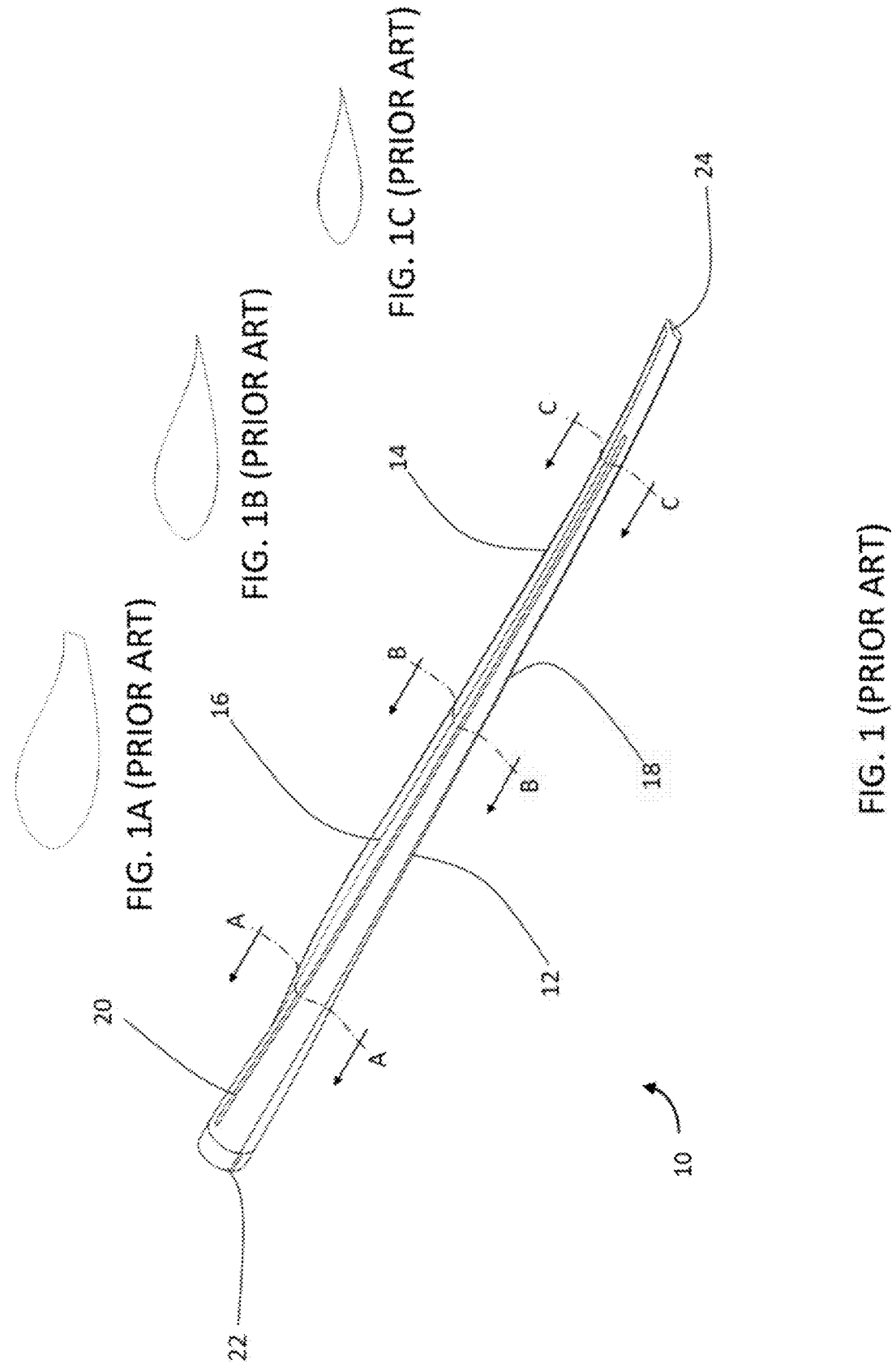
FIG. 1 is a perspective view of a representative wind blade.
Figure 13:
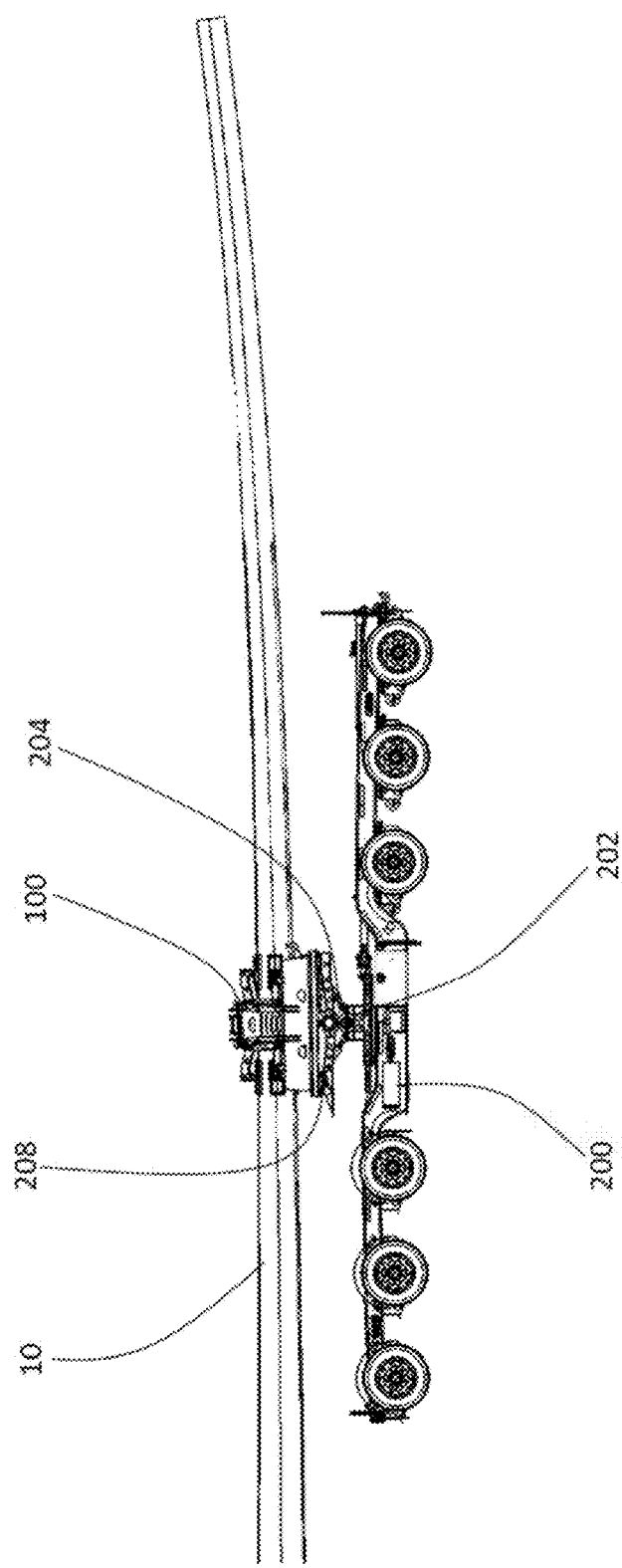
FIG. 13 is a right view of the tractor transportation system of FIG. 11 with a wind blade installed.

Referring to FIG. 1, a wind blade 10 for a horizontal-axis wind turbine generally takes the form of an airfoil having, in cross section, a more bulbous, rounded leading edge 12, a thinner, sharper trailing edge 14, a pressure surface 16, and a suction surface 18. The cross section of the wind blade 10 differs among wind blades of different types as well as along the length of the wind blade 10, as shown by FIGS. 1A to 1C. Modern wind blades 10 generally taper to a tip 24 from a widest point 20 proximate to a root 22. The wind blade 10 may also curve along its length and in particular near the tip 24 as can be seen in FIGS. 1 and 13, which may prevent the blade from contacting the wind turbine support tower when wind-loaded under operation. Therefore, the dimensions and curvature of the cross section of the wind blade 10 may differ significantly along the length of the wind blade 10.

Figure 2:
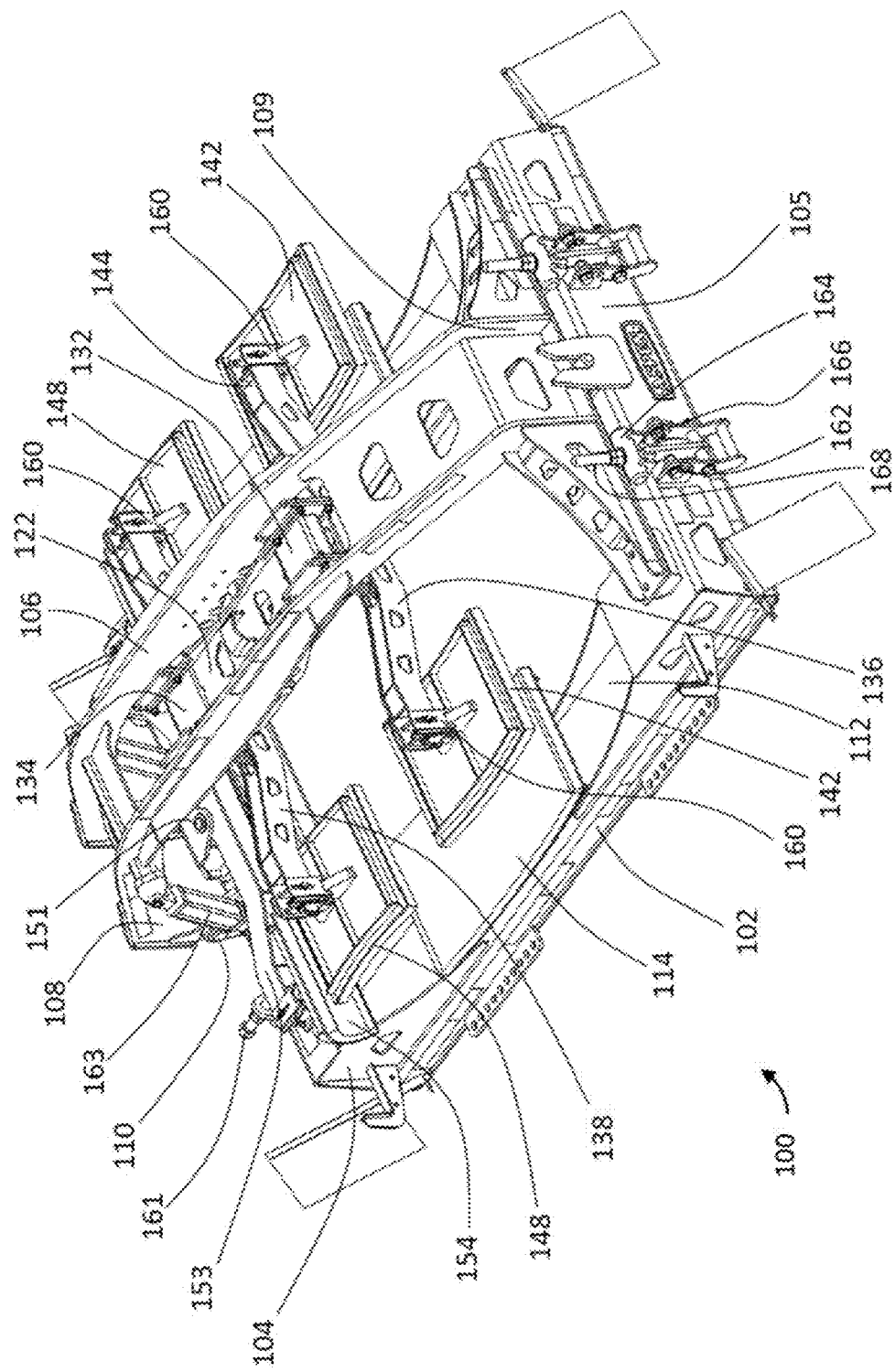
FIG. 2 is a left perspective view of a first embodiment of a wind blade clamp according to the invention in the closed position.
Figure 3:
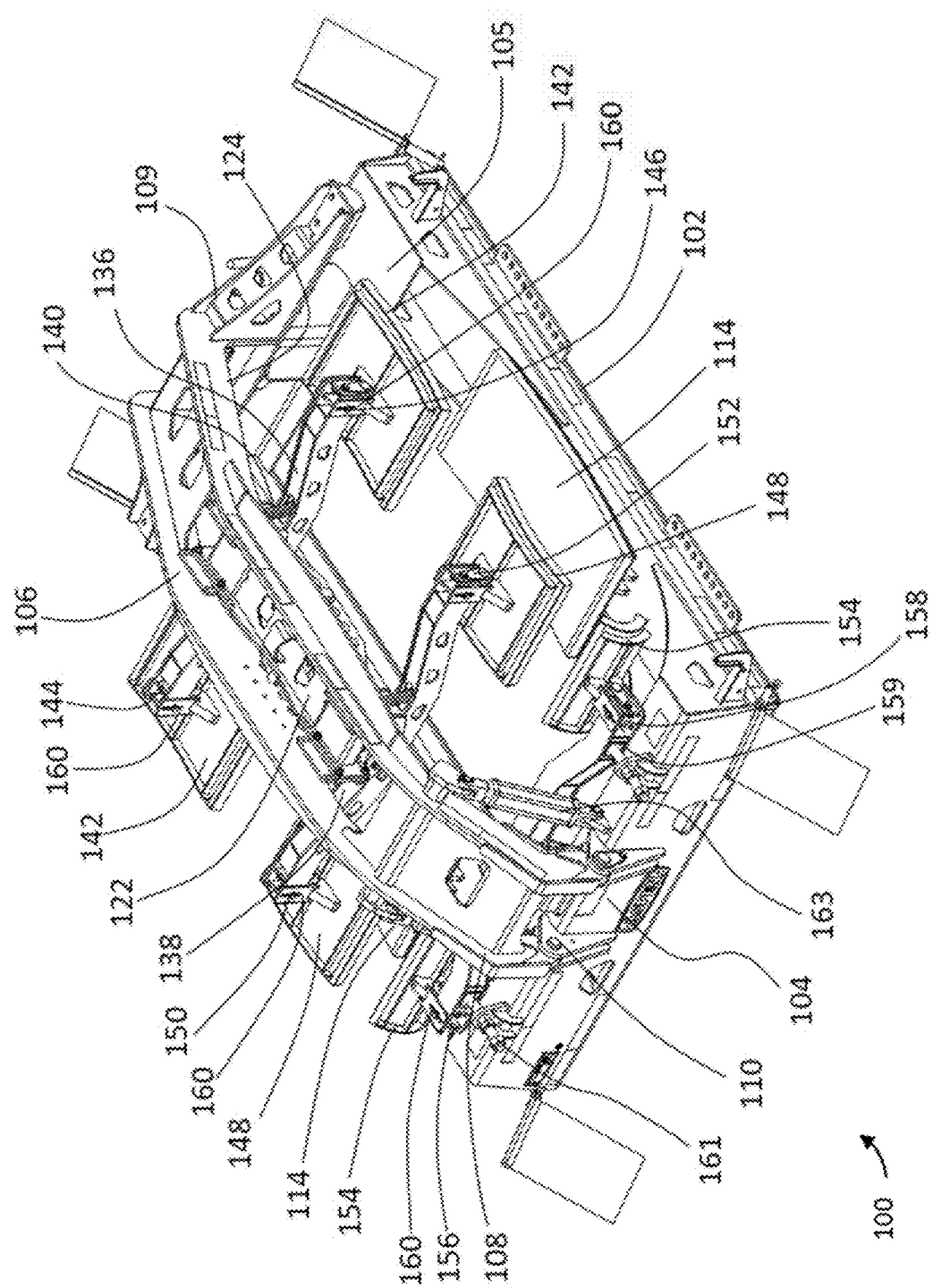
FIG. 3 is a right perspective view of the wind blade clamp of FIG. 2.
Figure 4:
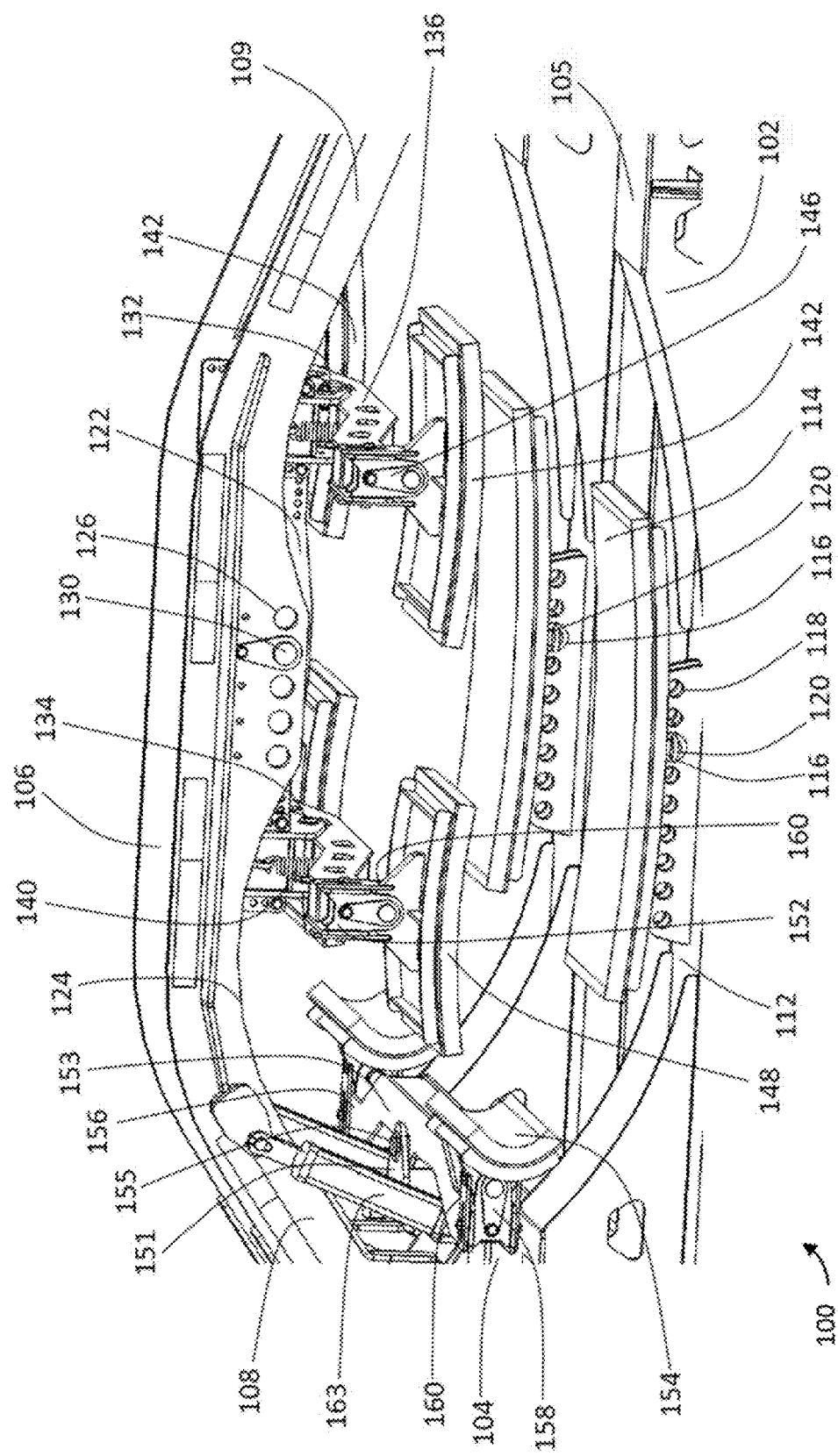
FIG. 4 is a partial rear perspective view of the primary support beam and walking beam assembly of the wind blade clamp of FIG. 2.
Figure 5:
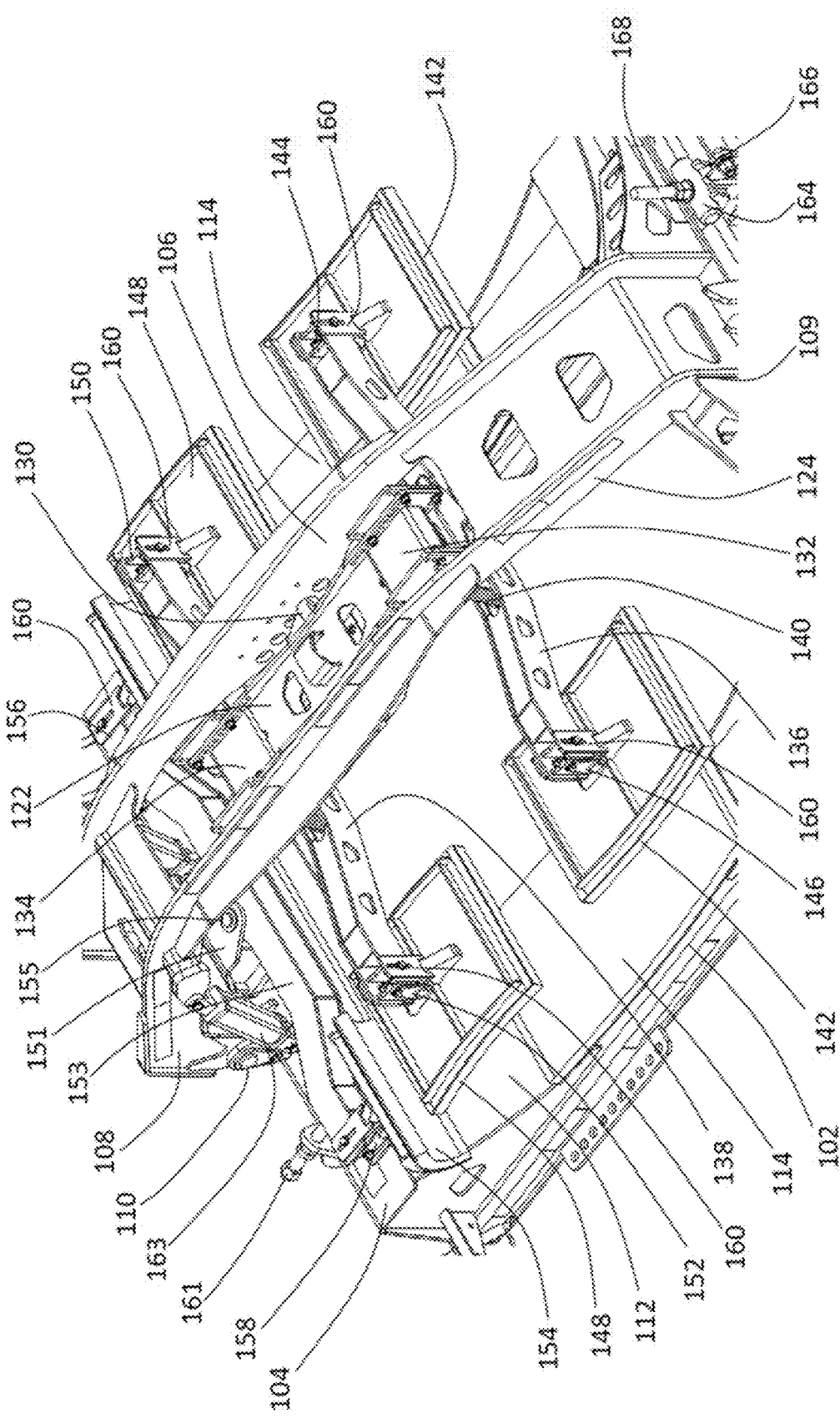
FIG. 5 is a partial left perspective view of the primary support beam of FIG. 2.
Figure 6:
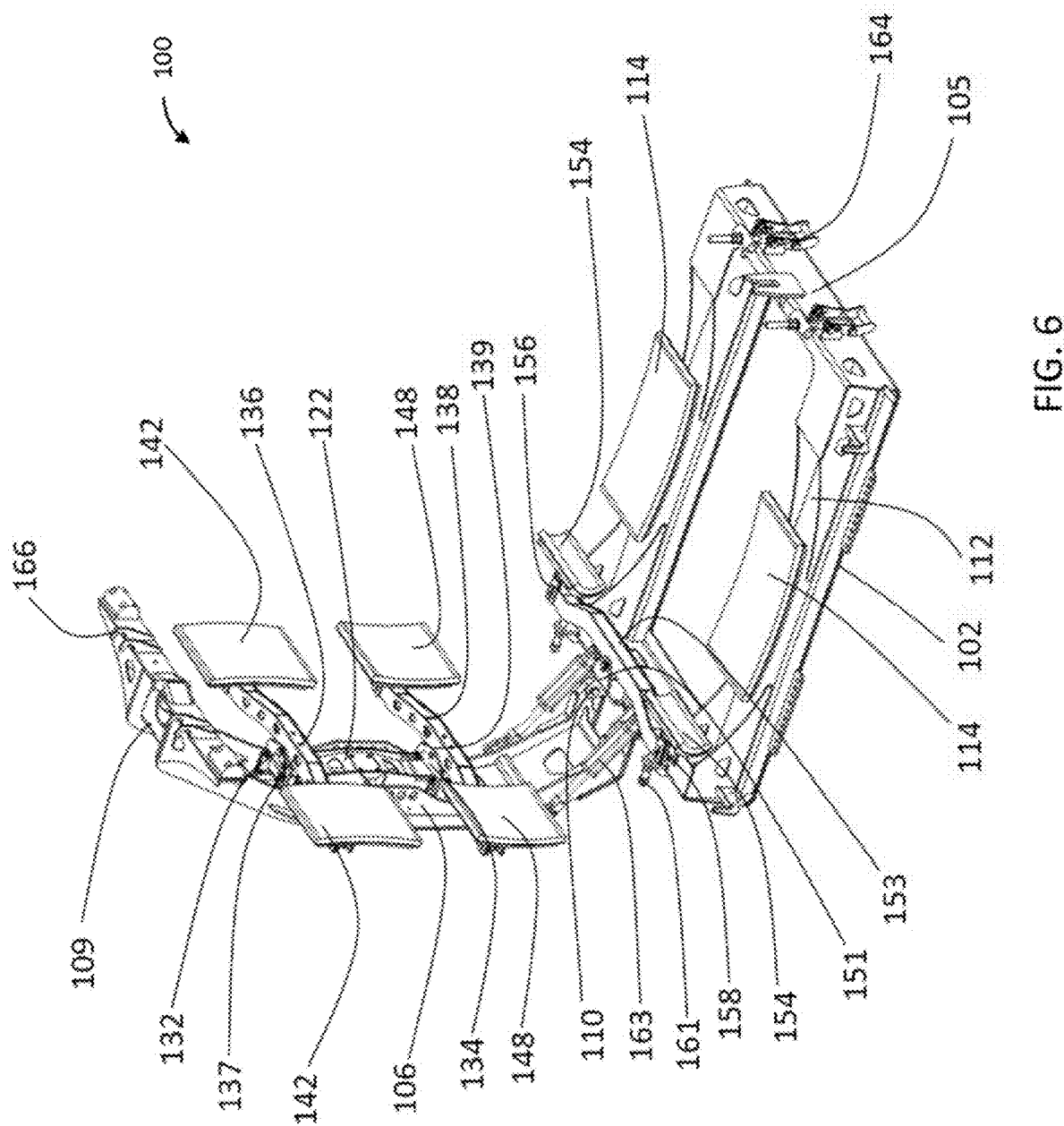
FIG. 6 is a rear perspective view of the wind blade clamp of FIG. 2 in the open position.
Figure 7:
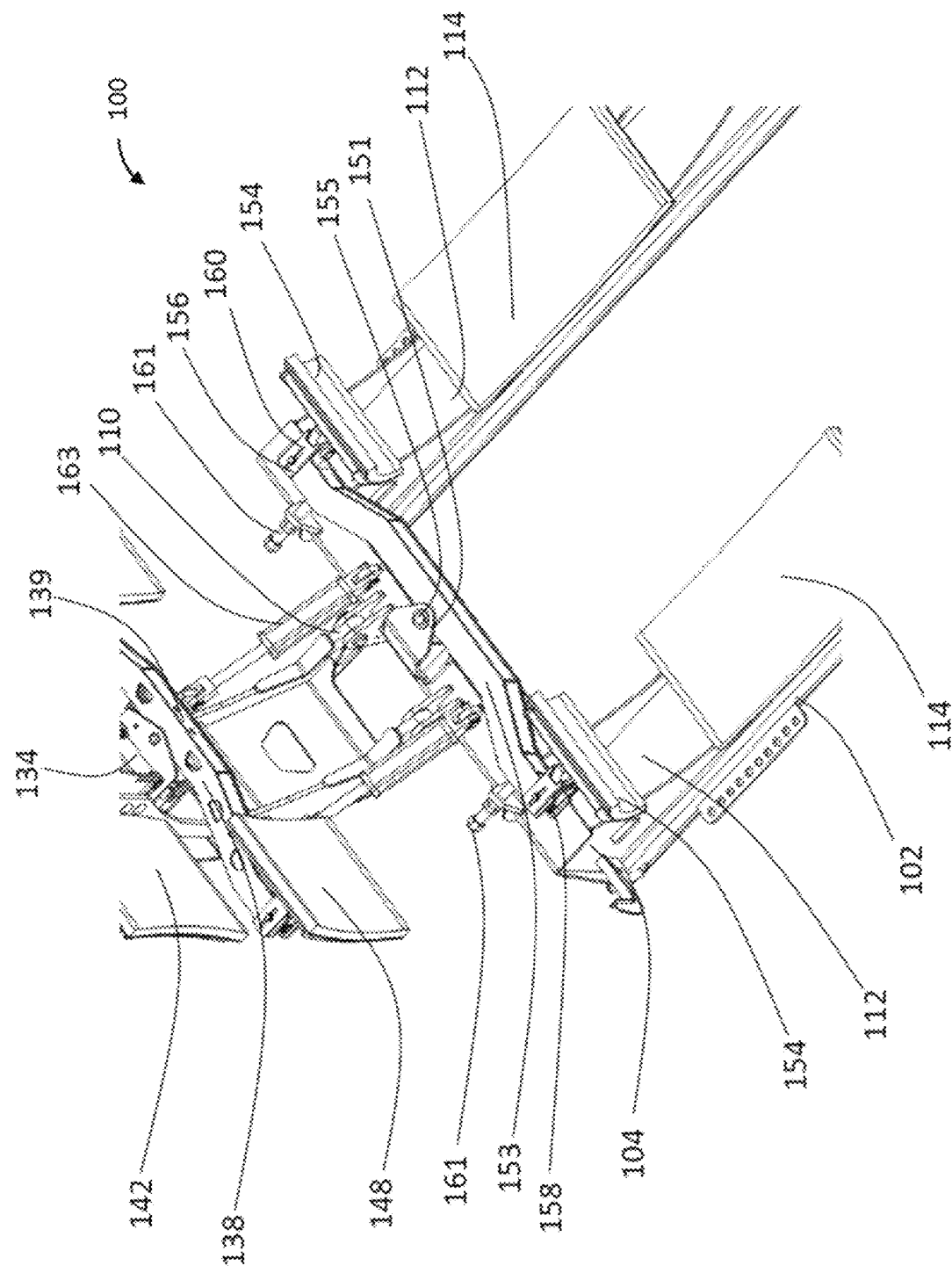
FIG. 7 is a partial top perspective view of the wind blade clamp of FIG. 6.

Referring to FIGS. 2 to 10, according to the preferred embodiment of the invention a wind blade clamp 100 comprises a lower jaw 102, the lower jaw 102 having a lower hinged end 104 and a lower open end 105, connected to an upper jaw 106, the upper jaw 106 having an upper hinged end 108 and an upper open end 109. The lower hinged end 104 is connected to the upper hinged end 108 by one or more clamp pivots 110, allowing the upper jaw 106 to open and close over the lower jaw 104 as shown in FIG. 2 as compared to FIG. 6, for example.

Figure 10:
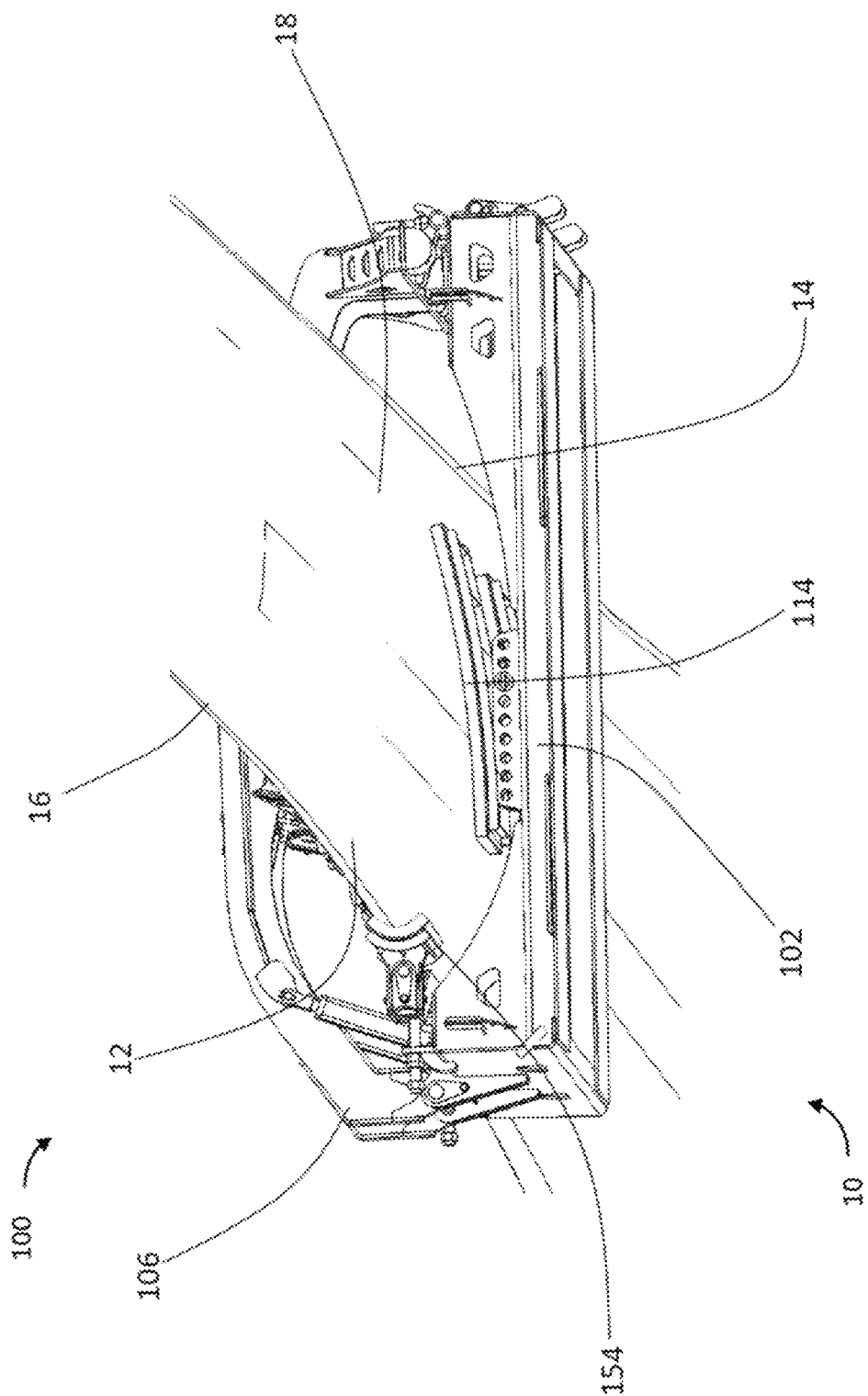
FIG. 10 is a partial bottom perspective view of the wind blade clamp of FIG. 8.

A lower inner surface 112 of the lower jaw 102 is lined by one or more lower pads 114. Preferably, there are two lower pads 114 as shown. Each lower pad 114 has a lower pad eyelet 116, and at least one lower jaw eyelet 118 for each lower pad 114 extends from the lower inner surface 112. A lower pin 120 can be inserted through the lower pad eyelet 116 and the respective lower jaw eyelet 118 to attach each lower pad 114 to the lower jaw 102, as can be seen best in FIG. 4. This attachment means allows each lower pad 114 to pivot about the lower pin 120 and automatically angle to evenly distribute the weight of the wind blade 10 across substantially the entire lower pad 114, as can be seen in FIG. 10. Preferably, there are a plurality of lower jaw eyelets 118 associated with each lower pad 114, which allows each lower pad 114 to be repositioned along the lower inner surface 112 in order to adapt the wind blade clamp 100 based upon the size of the wind blade 10 to be inserted and the relative position along the length of the wind blade 10 at which the wind blade 10 is clamped.

Figure 8:
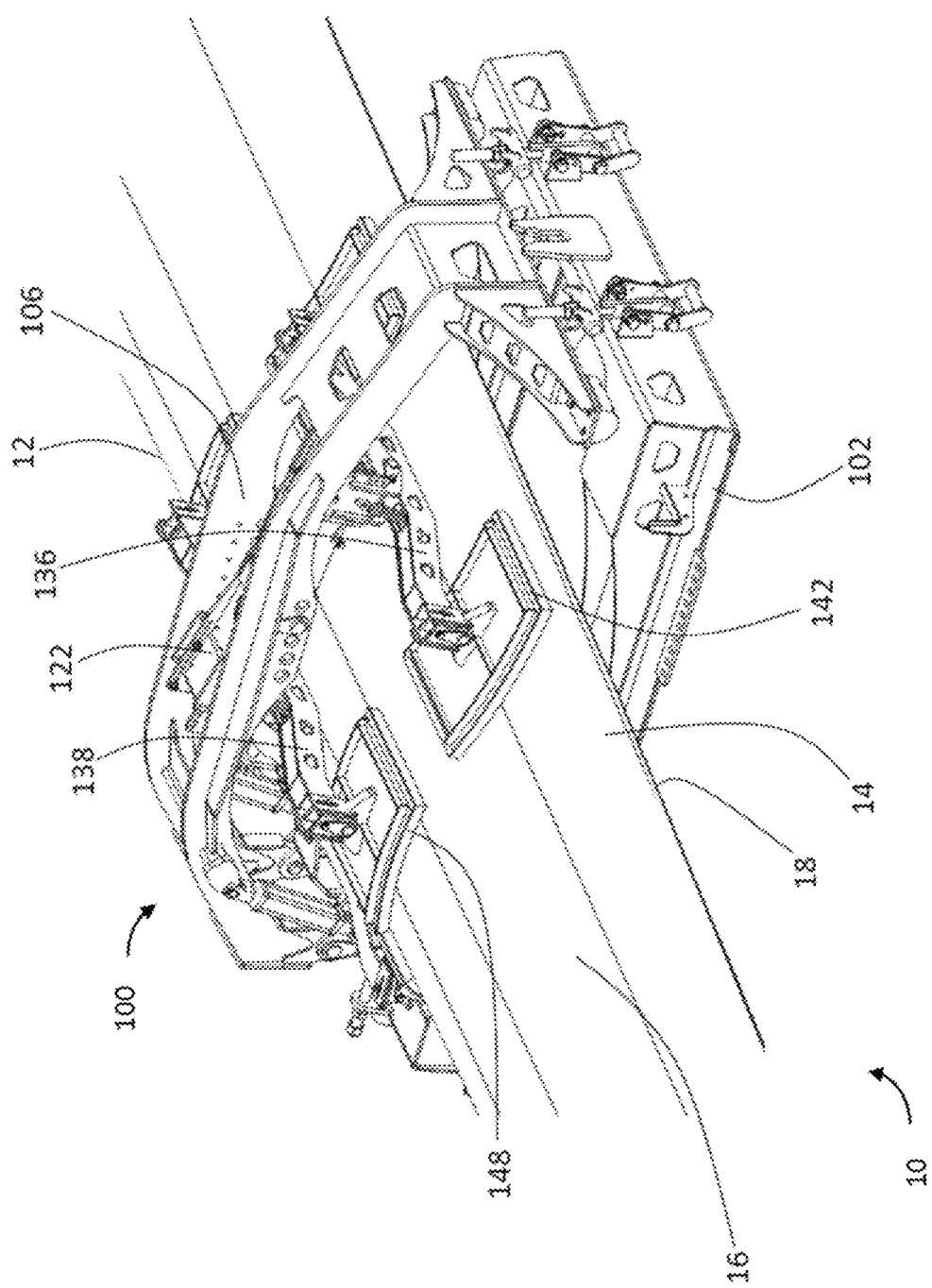
FIG. 8 is a partial left perspective view of the wind blade clamp of FIG. 2 holding a wind blade.
Figure 9:
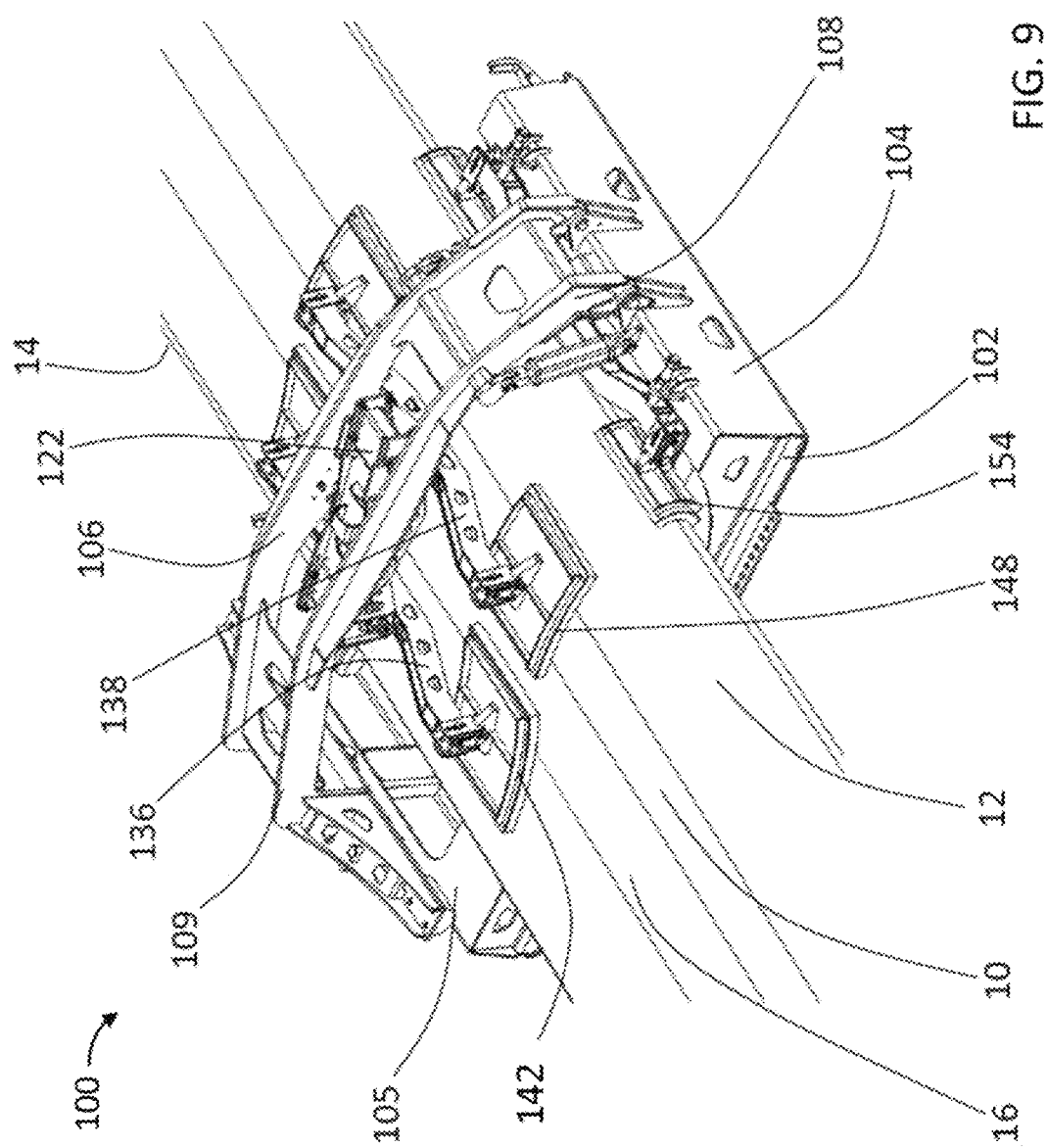
FIG. 9 is a partial right perspective view of the wind blade clamp of FIG. 8.

A primary support beam 122 depends from an upper inner surface 124 of the upper jaw 106. The upper inner surface 124 has one or more upper eyelets 126 and the primary support beam 122 has a primary support pin 130 situated proximate to the midpoint of the primary support beam 122. The primary support pin 130 is inserted through collinear upper eyelets 126 to attach the primary support beam 122 to the upper jaw 106, as can be seen best in FIGS. 4 and 5. The primary support beam 122 is thus able to pivot on primary support pin 130 as can be seen in FIGS. 8 and 9. The upper inner surface 124 preferably has multiple sets of collinear upper eyelets 126 as shown to allow the primary support pin 130 to be repositioned along the upper jaw 106 and thereby the pivot point of the primary support beam 122 is repositioned along the upper jaw 106) to adjust for varying cross sections of the wind blade 10 to be clamped. The primary support beam 122 will preferably be aligned substantially with the upper jaw 106 and therefore will be substantially perpendicular to the wind blade 10 when the wind blade clamp 100 is used on the wind blade 10, as shown in FIGS. 8 and 9.

The primary support beam 122 terminates in a trailing-edge fulcrum 132 and a leading-edge fulcrum 134. The leading-edge fulcrum 134 is preferably positioned proximate to the upper hinged end 108. A trailing-edge walking beam 136 is pivotably coupled to the trailing-edge fulcrum 132 and a leading-edge walking beam 138 is pivotably coupled to the leading-edge fulcrum 134. Preferably, the trailing-edge walking beam 136 is pivotably coupled to the trailing-edge fulcrum 132 at or proximate to a first midpoint 137 of the trailing-edge walking beam 136. Likewise, the leading-edge walking beam 138 is preferably pivotably coupled to the leading-edge fulcrum 134 at or proximate to a second midpoint 139 of the leading-edge walking beam 138. Both the trailing-edge walking beam 136 and the leading-edge walking beam 138 are preferably oriented substantially perpendicular to the primary support beam 122 and the upper jaw 106. Therefore, the trailing edge walking beam 136 and leading-edge walking beam 138 will be substantially aligned with the wind blade 10 and positioned generally over the trailing edge 14 and leading edge 12, respectively, of the wind blade 10 when the wind blade clamp 10 is used on the wind blade 10, as can be seen in FIGS. 8 and 9. Preferably, tension springs 140 extend from the trailing-edge fulcrum 132 to the trailing-edge walking beam 136 in opposing directions and from the leading-edge fulcrum 134 to the leading-edge walking beam 138 in opposing directions as shown to prevent the walking beams 136, 138 from freely pivoting on the respective fulcra 132, 134 when the wind blade clamp 100 is not holding the wind blade 10.

Two convex upper pads 142 are each pivotably coupled to a first end 144 and a second end 146 of the trailing-edge walking beam 136, respectively. Likewise, two concave upper pads 148 are each pivotably coupled to a third end 150 and a fourth end 152 of the leading-edge walking beam 138, respectively. The convex upper pads 142 generally match the curvature of the thinner cross-sectional portion of the wind blade 10 proximate to the trailing edge 14. Similarly, the concave upper pads 148 generally match the curvature of the thicker cross-sectional portion of the wind blade 10 proximate to the leading edge 12.

The lower jaw 102 preferably further comprises a side fulcrum 151 mounted on the lower inner surface 112 proximate to the lower hinged end 104. A side walking beam 153 is pivotably coupled at a third midpoint 155 to the side fulcrum 151. Two edge pads 154 are each pivotably coupled to a fifth end 156 and sixth end 158 of the side walking beam 153. The edge pads 154 are preferably concave to cradle and protect the leading edge 12 of the wind blade 10, as can be seen best in FIGS. 9 and 10. In other embodiments, the edge pads 154 may be designed to cradle the trailing edge 14 instead, although this is not preferred as the broader leading edge 12 spreads the reactionary force of the edge pads 154 out more. As no clamping force is provided through the side walking beam 153, there are preferably two lockout pads 159 provided, mounted to the lower hinged end 104 by way of threaded rods 161 and proximate to the fifth end 156 and sixth end 158, respectively. Once the wind blade 10 is positioned correctly against the edge pads 154, the lockout pads 159 can be extended on the threaded rods 161 to abut the fifth end 156 and sixth end 158, preventing the side walking beam 153 from inadvertently pivoting while the wind blade 10 is held by the wind blade clamp 100.

The trailing-edge walking beam 136, leading-edge walking beam 138, and side walking beam 152 preferably further comprise locking plates 160. The locking plates 160 may be extended and fixed in position against the convex upper pads 142, concave upper pads 148, and edge pads 154, respectively, in order to temporarily lock out any pivoting motion of the pads, which facilitates inserting the wind blade 10 into the wind blade clamp 100.

The wind blade clamp 100 preferably further comprises actuating means for opening and closing the wind blade clamp 100 and for providing some or all of the clamping force to hold the wind blade 10 in the wind blade clamp. Preferably, there are one or more hydraulic cylinders 163 extending from the lower hinged end 104 of the lower jaw 102 to the upper jaw 106. The hydraulic cylinders 163 are preferably double-acting to provide for finer control over opening and closing the wind blade clamp 100, and to provide some or all of the clamping force necessary to hold the wind blade clamp 100 closed.

The wind blade clamp 100 preferably further comprises locking means for holding the lower jaw 102 and upper jaw 106 together against transportation-induced shocks and vibration that might otherwise inadvertently release the wind blade 10. Preferably there are a plurality of toggle latches 162 attached to the lower open end 105 of the lower jaw 102 and a plurality of respective toggle keepers 164 attached to the upper open end 109 of the upper jaw 106. A toggle 166 of each toggle latch 162 is preferably attached using a threaded rod 168 to allow for the overall reach of the toggle latch 162 to be adjusted for wind blades 10 of different thicknesses. In some embodiments, the toggle latches 162 are attached to the upper open end 109 and the toggle keepers 164 are attached to the lower open end 105. However, this arrangement is not preferable as there is potential for the toggle latches 162 to release under gravity. When closed, the toggle latches 162 can provide some or all of the clamping force required to hold the wind blade 10 in the wind blade clamp 100.

Referring in particular to FIGS. 8-10, when the wind blade clamp 100 clamps the wind blade 10 at a given point, the primary support beam 122 pivots on the primary support pin 130 to generally match the slope of the pressure surface 16 of the wind blade 10 from the leading edge 12 to the trailing edge 14. Further, each walking beam 136, 138 pivots on the respective fulcra 132, 134 to generally align to the slope of the wind blade 10 along its length corresponding to the combined effects of tapering and curvature of the wind blade 10. Further still, the upper convex pads 142 and upper concave pads 148 pivot on the respective ends of the walking beams 136, 138 to engage with the pressure surface 16 proximate to the trailing edge 14 and leading edge 12. Additionally, the lower pads 114 pivot to generally match the slope of the suction surface 18 from the leading edge 12 to the trailing edge 14. All of these adjustments occur essentially automatically (that is, with minimal manual intervention) as the wind blade 10 is clamped. This is believed to be due to the shape of the wind blade 10 at the given point it is clamped and the clamping forces and reaction forces balancing across the various pivot points.

The wind blade clamp 100 is advantageously usable in conjunction with a variety of different forms of transportation. Generally, the wind blade clamp 100 is attached to a base structure. The details of the base structure and the attachment apparatus will vary depending on the size of the wind blade 10 and the transportation form.

Figure 11:
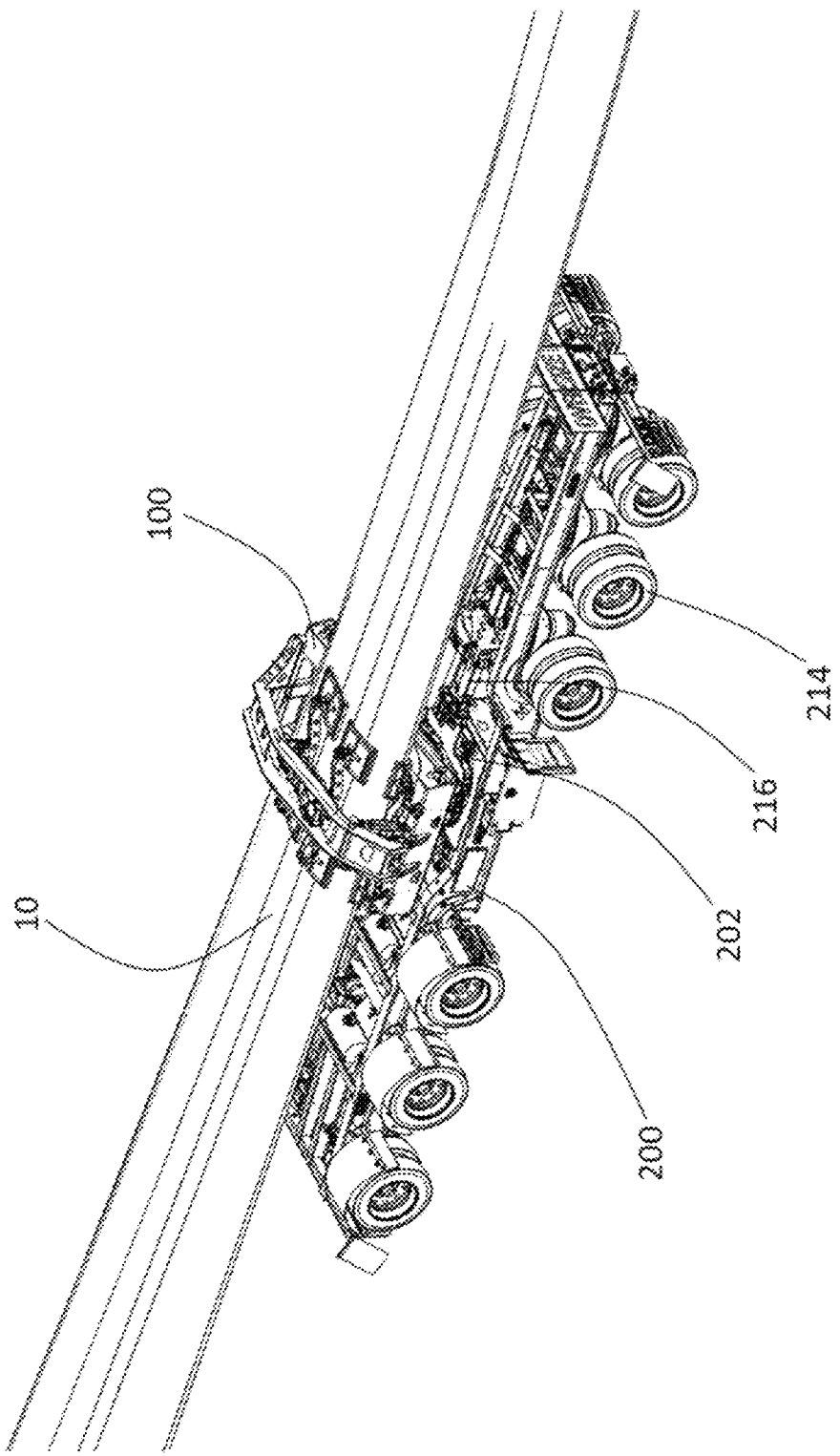
FIG. 11 is a perspective view of a preferred embodiment of a tractor transportation system using a wind blade clamp according to the invention.
Figure 12:
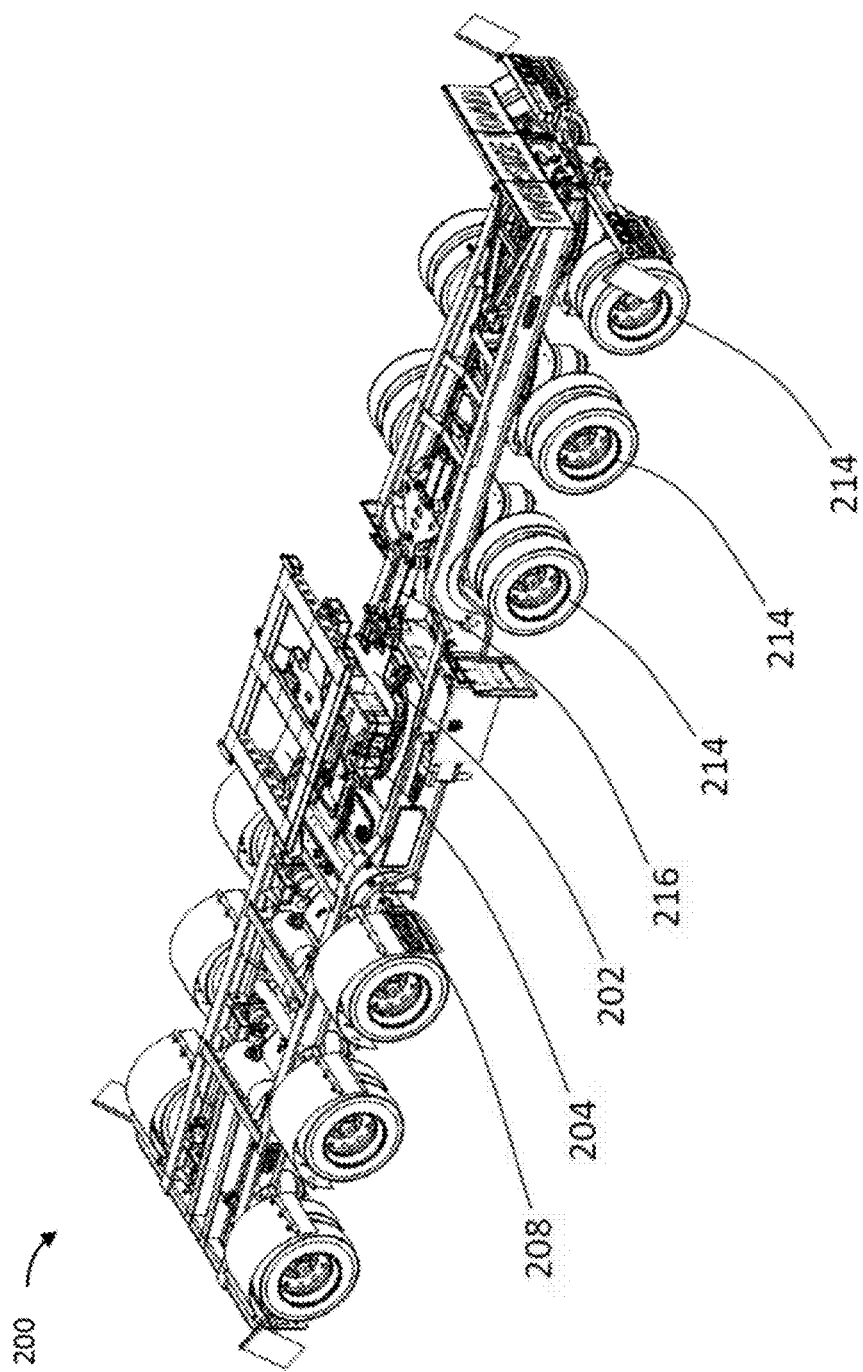
FIG. 12. is a perspective view of the tractor transportation system of FIG. 11 with the wind blade clamp removed.

Referring to FIGS. 11-13, according to the preferred embodiment, the base structure comprises a wheeled trailer 200. A turntable 202 is mounted to the wheeled trailer 200. The turntable carries a first tilt table 204 which has a first tilt axis 206. A second tilt table 208 is mounted on the first tilt table 204, and has a second tilt axis 210. The second axis of tilt 210 is preferably oriented substantially orthogonal to the first axis of tilt 206. The wind blade clamp 100 is then rigidly mounted to the second tilt table 208.

The rotation of both tilt tables about their respective tilt axes will preferably be controlled using pairs of tilt hydraulic cylinders 211 associated with each tilt table. Hydraulic power is supplied to the tilt hydraulic cylinders 211 by an auxiliary power unit 213 associated with the trailer 200. Advantageously, the auxiliary power unit 213 also provides hydraulic power to the hydraulic cylinders 163 on the wind blade clamp.

When in use, the root 12 of the wind blade 10 is held by a tractor unit (not shown) by any method already known in the art and the wind blade clamp 100 on the wheeled trailer 200 is clamped to the wind blade 10 at a point along its length. The arrangement of second tilt table 206 on first tilt table 202 on turntable 202 allows the wind blade clamp 100 to be angled relative to the wheeled trailer 200 to account for the curvature of the wind blade 10 as shown in FIGS. 13-14, and to allow the wind blade clamp to twist, yaw, and roll relative to the wheeled trailer 200 as necessary to allow the wheeled trailer 200 to navigate corners and hills during transportation without damaging the wind blade 10. Preferably, one or more wheel pairs 214 of the wheeled trailer 200 is connected to the turntable 202 by a steering linkage 216, which allows the wheeled trailer 200 to more smoothly follow the movement of the tractor unit and wind blade 10 and reduces the likelihood of the wheeled trailer 200 jackknifing relative to the wind blade 10.

According to some embodiments, the base structure comprises a ship deck of a ship. Alternatively, the base structure may comprise a rack which is fixed to the ship deck, which allows multiple wind blades 10 to be transported, one over or beside another. For sufficiently short wind blades 10, the rack may be located in the ship hold. In any of these cases, the wind blade clamp 100 can be rigidly fixed to the deck or rack by any of a number of well-known methods, including but limited to welding and bolting. The root 22 may be supported by any of the apparatus known in the art, and those apparatus may be likewise affixed to the ship deck, or to a longitudinally spaced apart root rack.

According to some embodiments, the base structure comprises a railcar. For wind blades approximately 30 metres or shorter, it may be possible for the wind blade clamp 100 to be mounted directly and rigidly to the railcar (comparable to the ship deck), as this length does not substantially exceed the length of the average railcar. For longer wind blades, it may be necessary to hold the root 22 on one railcar and the wind blade clamp 100 on the next consecutive railcar. In these situations, the base structure should comprise the railcar, a turntable, a first tilt table, and second tilt table, arranged in a manner comparable to the embodiments used with the wheeled trailer. This will allow the wind blade 10 to yaw, pitch and roll independently of the railcar in response to turns and hills, which reduces transportational stresses on the wind blade 10.

While the foregoing description is directed towards wind blades 10 used in association with horizontal-axis wind turbines, it will be apparent that the wind blade clamp 100 may also be used in conjunction with vertical-axis wind turbine blades with suitable modification known to the skilled technician. The wind blade clamp 100 may also be used with suitable modification to transport the support tower, or components of the support tower, of the wind turbine.

In the foregoing description, exemplary modes for carrying out the invention in terms of examples have been described. However, the scope of the claims should not be limited by those examples, but should be given the broadest interpretation consistent with the description as a whole. The specification and drawings are, accordingly, to be regarded in an illustrative rather than a restrictive sense.

While the preferred embodiment of the invention has been illustrated and described, as noted above, many changes can be made without departing from the spirit and scope of the invention. Accordingly, the scope of the invention is not limited by the disclosure of the preferred embodiment. Instead, the invention should be determined entirely by reference to the claims that follow.

We claim:

1. A clamping apparatus for securing a wind turbine blade, said clamping apparatus comprising:
    a lower jaw;
    an upper jaw, the upper jaw comprising a primary support beam depending from and pivotably coupled to an inner surface of said upper jaw;
    one or more lower pads connected to said lower jaw; and
    two walking beam assemblies pivotably coupled to respective ends of said primary support beam, each of said two walking beam assemblies comprising:
        a walking beam, and
        a plurality of upper pads pivotably coupled to said walking beam, at least two upper pads of said plurality of upper pads pivotably coupled to respective ends of said walking beam.

2. The clamping apparatus of claim 1 wherein said upper jaw is pivotably connected to said lower jaw.

3. The clamping apparatus of claim 1, said lower jaw further comprising a side pad assembly pivotably connected to said lower surface jaw.

4. The clamping apparatus of claim 3, said side pad assembly comprising a side walking beam and two edge pads, each of said edge pads pivotably connected to a respective end of said side walking beam.

5. The clamping apparatus of claim 1 further comprising a base and a joint assembly connecting said lower jaw to said base.

6. The clamping apparatus of claim 5 wherein said base further comprises a plurality of wheels.

7. The clamping apparatus of claim 5 wherein said joint assembly permits one degree of freedom of rotational movement of said lower surface jaw relative to said base.

8. The clamping apparatus of claim 5 wherein said joint assembly permits two degrees of freedom of rotational movement of said lower surface jaw relative to said base.

9. The clamping apparatus of claim 5 wherein said joint assembly permits three degrees of freedom of rotational movement of said lower surface jaw relative to said base.

10. The clamping apparatus of claim 1 wherein each of said plurality of lower pads is repositionable along said lower jaw.

11. The clamping apparatus of claim 1 wherein said primary support beam is repositionable along said inner surface of said upper jaw.

12. The clamping apparatus of claim 1 wherein each of said plurality of lower pads is pivotably connected to said lower surface jaw.

* * * * *